United States Patent [19]

Tanaka et al.

[11] Patent Number: 4,885,456

[45] Date of Patent: Dec. 5, 1989

[54] TEMPERATURE CONTROLLER

[75] Inventors: Teruya Tanaka, Kanagawa; Katsuharu Matsuo, Aichi, both of Japan

[73] Assignee: Kabushiki Kaisha Toshiba, Kawasaki, Japan

[21] Appl. No.: 260,704

[22] Filed: Oct. 21, 1988

[30] Foreign Application Priority Data

Oct. 21, 1987 [JP] Japan .................. 62-265946

[51] Int. Cl.⁴ .............................................. H05B 1/02
[52] U.S. Cl. .................................. 219/497; 219/212; 219/505; 219/492; 323/235
[58] Field of Search ............... 219/494, 492, 497, 499, 219/501, 505, 212, 508, 509; 323/235, 236, 319

[56] References Cited

U.S. PATENT DOCUMENTS

| | | | |
|---|---|---|---|
| 4,485,296 | 11/1984 | Veda et al. | 323/235 |
| 4,546,239 | 10/1985 | Sugimori | 219/497 |
| 4,567,425 | 1/1986 | Bloomer | 323/235 |
| 4,598,195 | 7/1986 | Matsuo | 323/235 |
| 4,680,490 | 7/1987 | Baker et al. | 323/235 |
| 4,745,262 | 5/1988 | Larsen | 323/236 |

FOREIGN PATENT DOCUMENTS 61-38487 8/1986 Japan .

OTHER PUBLICATIONS

Kimata et al., "Washable Electric Blanket with Room-Temperature Sensor," National Technical Report, vol. 30, No. 5, Oct. 1984, pp. 26-34.

Primary Examiner—M. H. Paschall
Attorney, Agent, or Firm—Foley & Lardner, Schwartz, Jeffery, Schwaab, Mack, Blumenthal & Evans

[57] ABSTRACT

A temperature controller compares a temperature detection signal outputted from a temperature sensor with a set temperature preliminary set in a temperature setting circuit. According to a result of the comparison and before a zero-cross point of an AC voltage applied from a commercial AC source to a heating member, a driving circuit of the temperature controller outputs a driving signal to a thyristor to turn ON the thyristor at the zero-cross point. Then the AC voltage is applied to the heating member via the thyristor. Since the determination of turning ON or OFF the thyristor is made before the zero-cross point of the AC voltage applied through the thyristor, the thyristor may surely be turned ON or OFF at the zero-cross point to prevent electromagnetic wave noises from occurring.

13 Claims, 11 Drawing Sheets

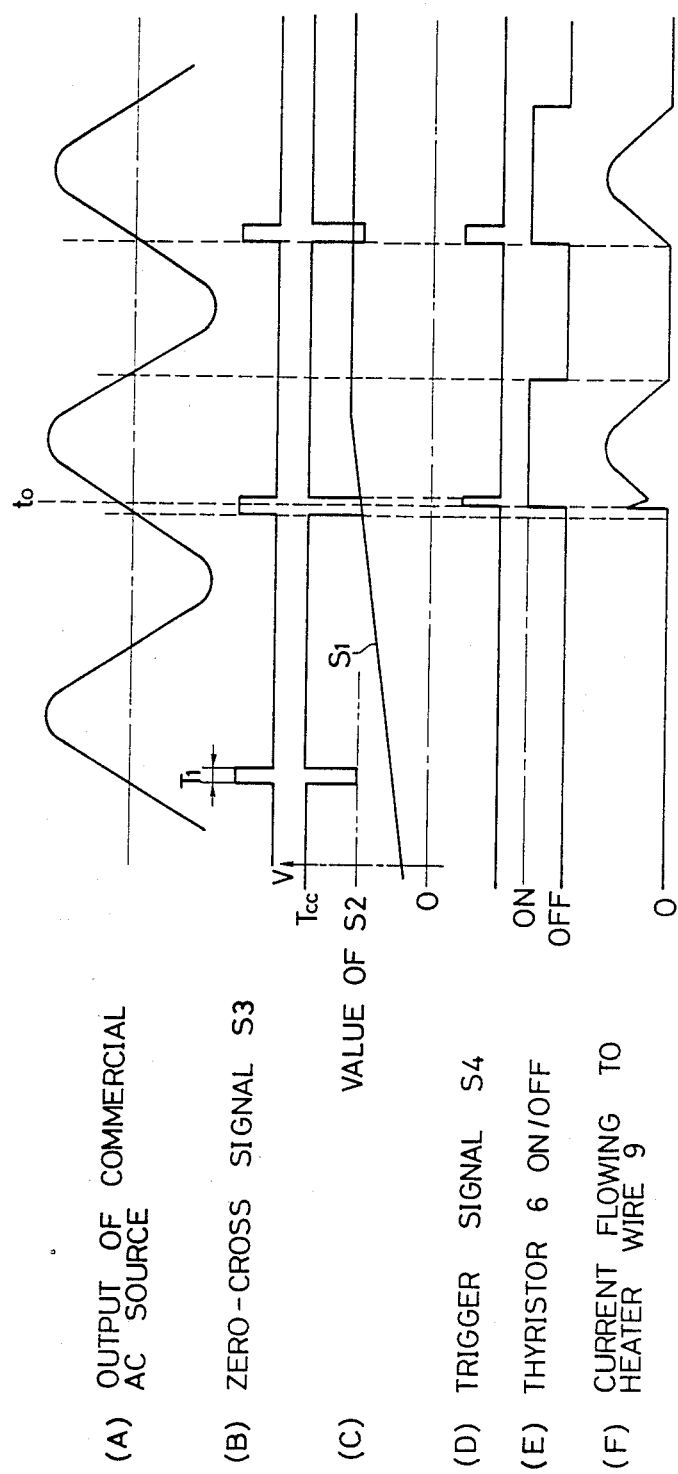

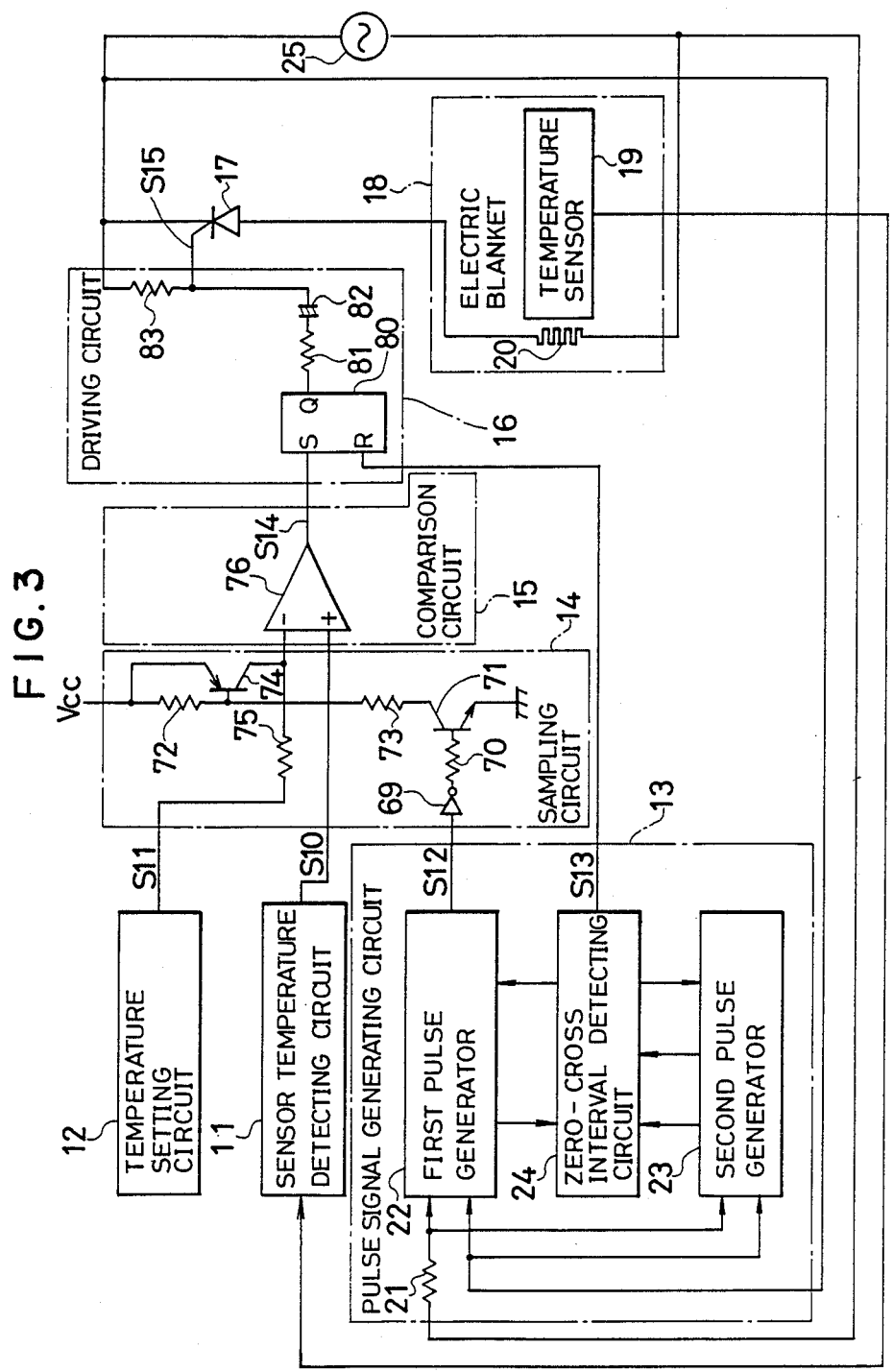

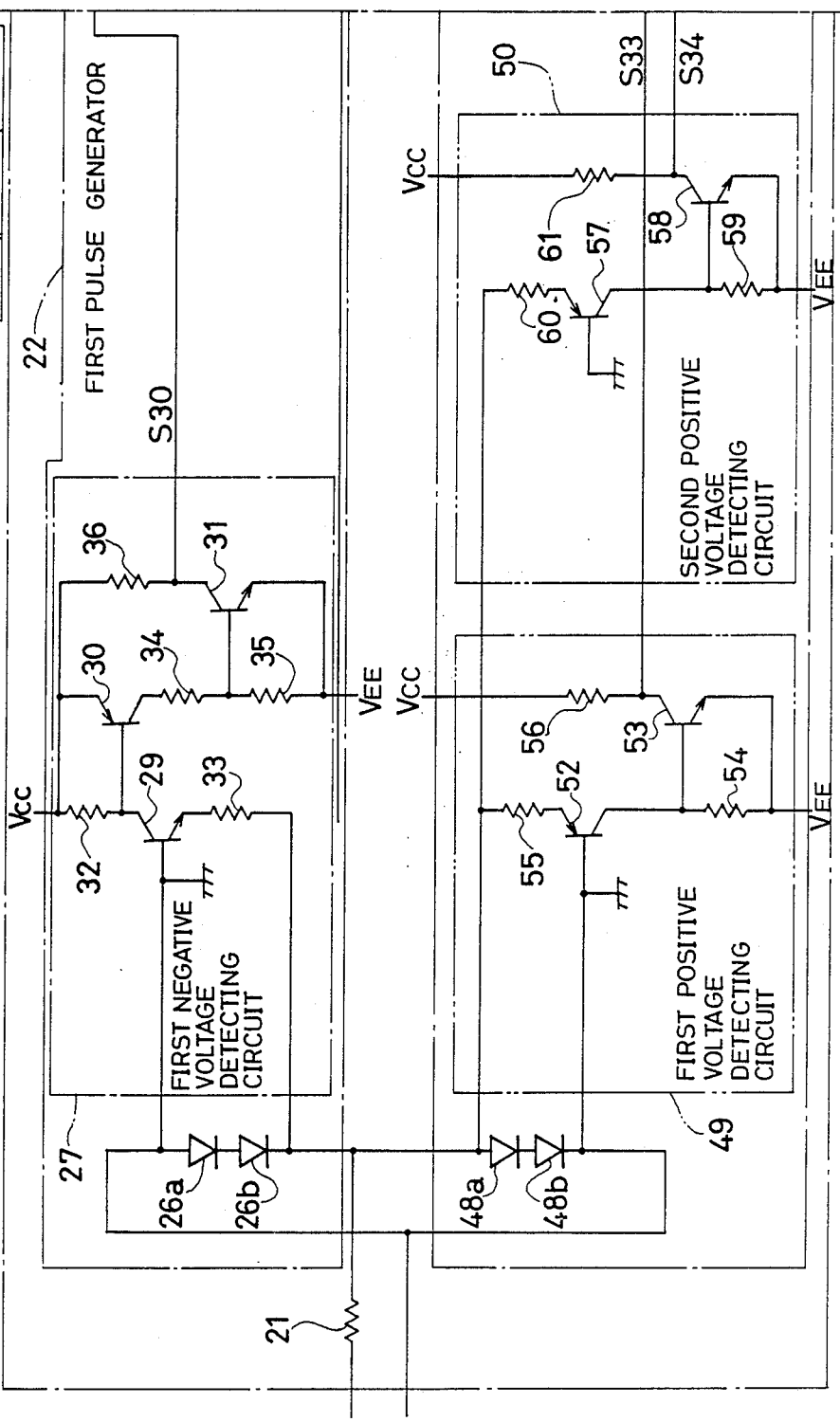

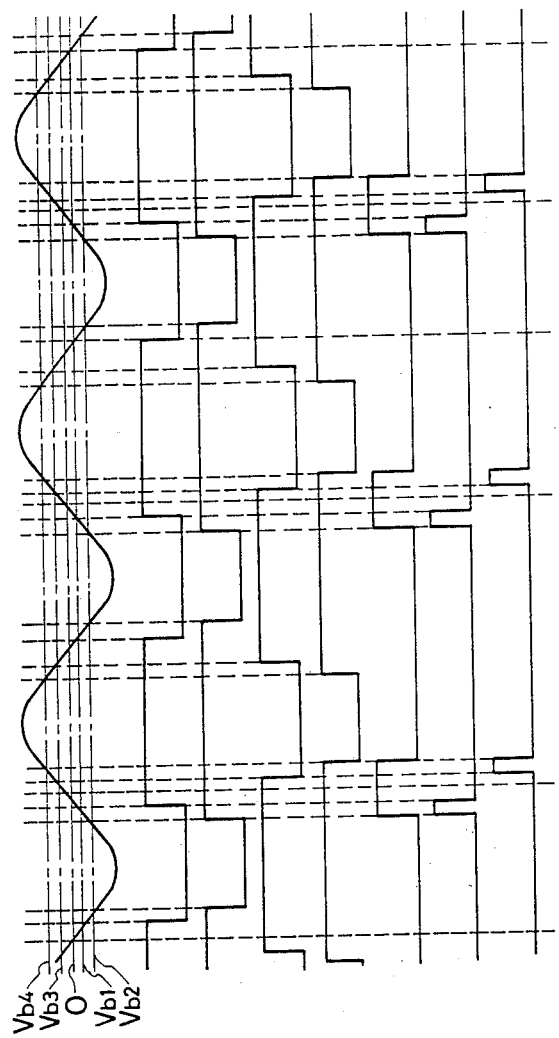

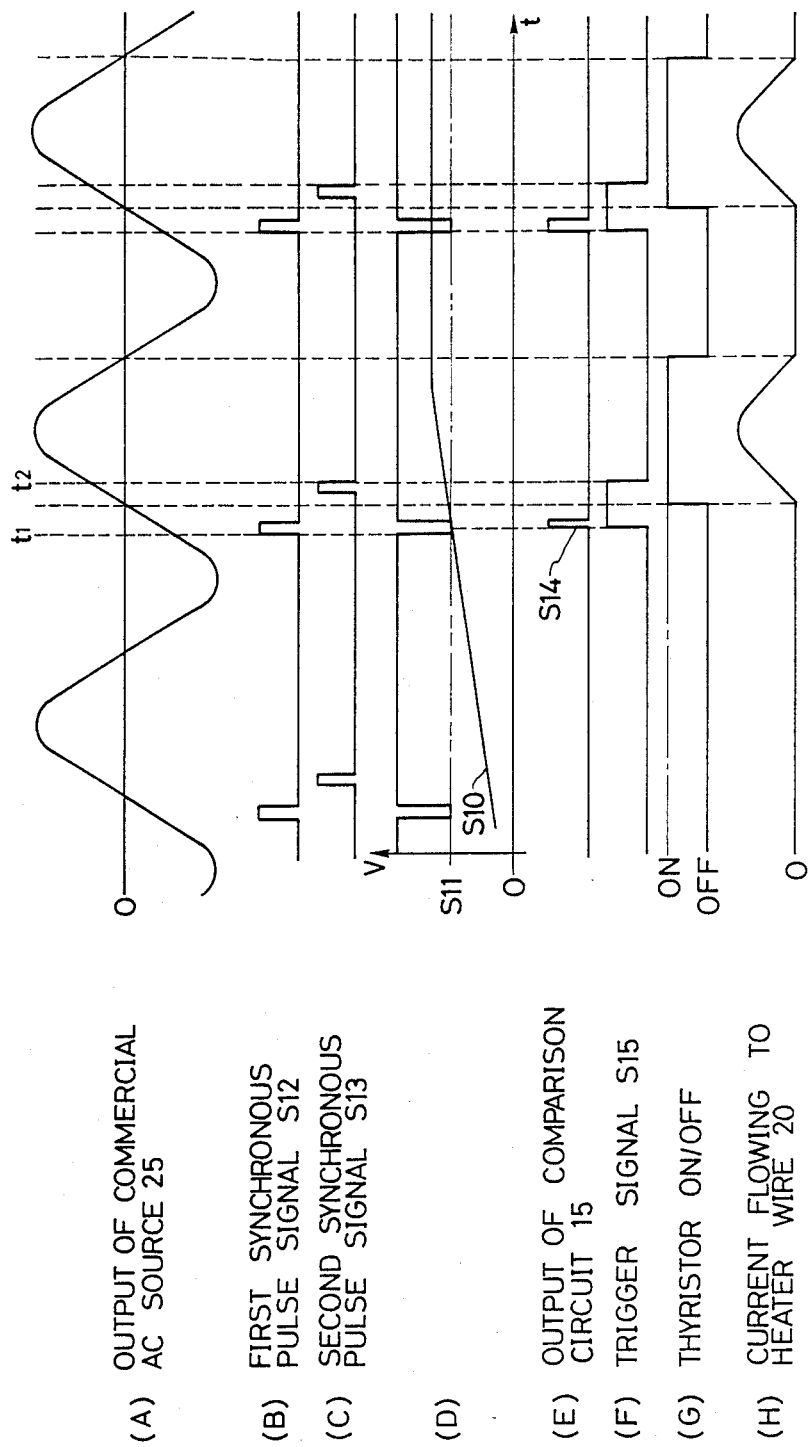

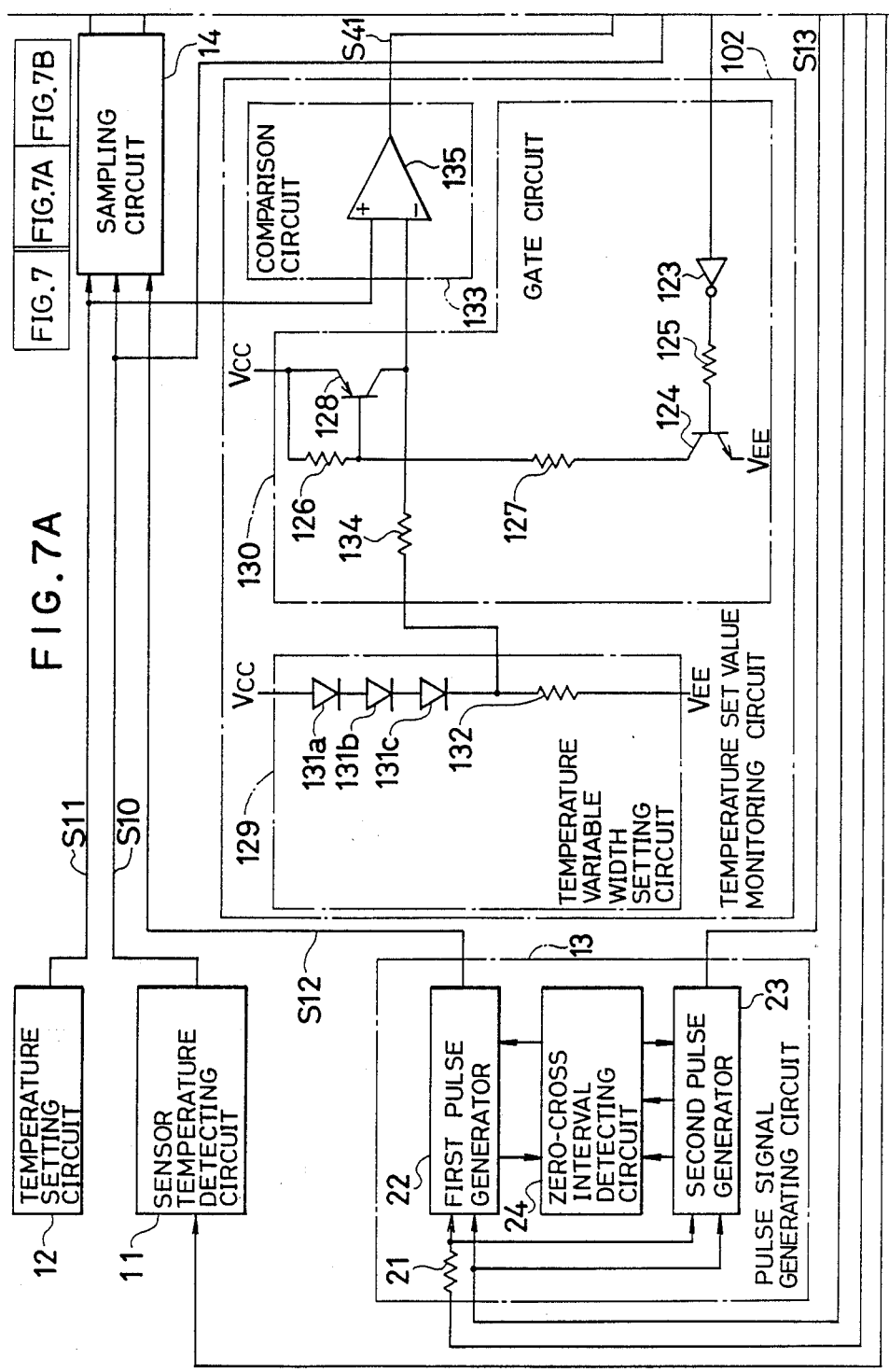

TEMPERATURE CONTROLLER

BACKGROUND OF THE INVENTION

1. Field of the Invention

The present invention relates to a temperature controller adopted for electric blankets, electric carpets, electric floor heaters, etc.

2. Description of the Prior Art

A heating apparatus such as an electric blanket includes a blanket proper and a temperature controller which is connected to the blanket proper via a cable. The temperature controller controls the calorific value of a heater wire disposed in the blanket proper, thus controlling the temperature of the blanket.

FIG. 1 is a block diagram showing an electric blanket and a conventional temperature controller for controlling the temperature of the blanket.

In the figure, the temperature controller comprises a sensor temperature detecting circuit 1, a temperature setting circuit 2, a zero-cross signal generating circuit 3, a sampling circuit 4, a comparison circuit 5a, a driving circuit 5b and a thyristor 6. To control the temperature of an electric blanket 7, the value of a temperature detection signal outputted from a temperature sensor 8 disposed in the blanket 7 is compared with a set temperature set in the temperature setting circuit 2, and, according to a result of the comparison, a current to be supplied to a heater wire 9 buried in a cloth of the blanket 7 is controlled.

The constitution and operation of the conventional temperature controller will be described.

The sensor temperature detecting circuit 1 receives a temperature detection signal outputted from the temperature sensor 8 arranged in the electric blanket 7, and, according to the received signal, outputs a temperature detection signal S1 to the comparison circuit 5a.

The temperature setting circuit 2 supplies a temperature setting signal S2 corresponding to a predetermined temperature to the sampling circuit 4.

The zero-cross signal generating circuit 3 receives an AC voltage from a commercial AC source 10 which supplies electric power to the heater wire 9, and detects a zero-cross point of the AC voltage. After detecting the zero-cross point, the circuit 3 generates a zero-cross signal S3 and supplies it to the sampling circuit 4.

When no zero-cross signal S3 is supplied, the sampling circuit 4 latches its output terminal voltage, and, when the zero-cross signal S3 is supplied thereto, the sampling circuit 4 picks up the temperature setting signal S2 outputted from the temperature setting circuit 2 to supply the same to the comparison circuit 5a.

The comparison circuit 5a compares the temperature setting signal S2 outputted from the sampling circuit 4 with the temperature detection signal S1 outputted from the sensor temperature detecting circuit 1. If the signals have the relation of S1 >S2, i.e., if the temperature of the electric blanket 7 is lower than that set in the temperature setting circuit 2, the comparison circuit 5a supplies a driving signal to the driving circuit 5b.

After receiving the driving signal, the driving circuit 5b supplies a trigger signal S4 to a gate of the thyristor 6. Due to the trigger signal S4, the thyristor 6 becomes conductive to flow a current to the heater wire 9 in the sequence of an end $10_a$ of the commercial AC source 10, the heater wire 9, an anode of the thyristor 6, a cathode of the thyristor 6, and another end $10b$ of the commercial AC source 10, thus increasing the temperature of the blanket 7.

According to the conventional temperature controller described in the above, the thyristor 6 will not be triggered if the width of the zero-cross signal S3 outputted from the zero-cross signal generating circuit 3 is narrow or if a variation in the circuit operation causes the zero-cross signal 3 to be asynchronous with the AC voltage outputted from the commercial AC source 10.

To cope with this problem, the conventional temperature controller outputs the zero-cross signal S3 of relatively wide width Tl as shown in FIG. 2(B) from the zero-cross signal generating circuit 3 at the time when the AC voltage shown in FIG. 2(A) outputted from the commercial AC source 10 changes from negative to positive.

However, if the width of the zero-cross signal S3 is wide, a value of the temperature setting signal S2 outputted from the sampling circuit 4 may coincide with a value of the temperature detection signal S1 outputted from the sensor temperature detecting circuit 1 at the time of, for instance, to which is not the zero-cross point, as shown in FIG. 2(C).

Due to this, the driving circuit 5b outputs the trigger signal S4 shown in FIG. 2(D) to turn ON the thyristor 6 as shown in FIG. 2(E).

If the thyristor 6 is turned ON fairly long time after the zero-cross point, a current suddenly flows to the heater wire 9 as shown in FIG. 2(F) to generate a high-frequency noise which becomes an electromagnetic wave noise that badly influence radius and televisions.

SUMMARY OF THE INVENTION

An object of the present invention is to provide a temperature controller that can surely turn ON and OFF a thyristor at the zero-cross point of an AC voltage outputted from a commercial AC source to prevent an electromagnetic wave noise from occurring.

In order to accomplish the object, the present invention provides a temperature controller which turns ON and OFF a thyristor according to a result of the comparison of a temperature detection signal outputted from a temperature sensor and a set temperature set in a temperature setting portion, thus controlling the caloric value of a heating member which generates heat according to an AC voltage applied thereto through the thyristor. The temperature controller comprises a driving means which outputs a driving signal according to the comparison result such that the thyristor is activated before a zero-cross point of the AC voltage.

The temperature controller according to the present invention compares the temperature detection signal outputted from the temperature sensor with the set temperature preliminary set in the temperature setting portion. According to a result of the comparison, the driving means of the temperature controller outputs a driving signal for driving the thyristor before the zero-cross point of the AC voltage applied to the heating member to control turning ON and OFF the thyristor. Therefore, the thyristor is turned ON at the zero-cross point to apply the AC voltage to the heating member so that a noise at the time of application of the AC voltage may not occur.

These and other objects, features and advantages of the present invention will be more apparent from the following detailed description of preferred embodiments in conjunction with the accompanying drawings.

BRIEF DESCRIPTION OF THE DRAWINGS

FIG. 2 is a waveform diagram showing the operation of the temperature controller shown in FIG. 1;

FIG. 3 is a block diagram showing a temperature controller according to an embodiment of the present invention;

FIGS. 4a and 4b are circuit diagrams showing the details of a pulse signal generating circuit shown in FIG. 3;

FIG. 5 is a waveform diagram showing the operation of the pulse signal generating circuit shown in FIG. 4;

FIG. 6. is a waveform diagram showing the operation of the embodiment;

FIG. 7a and 7b are block diagrams showing a temperature controller according to another embodiment of the present invention;

DETAILED DESCRIPTION OF THE PREFERRED EMBODIMENTS

Figure 1:
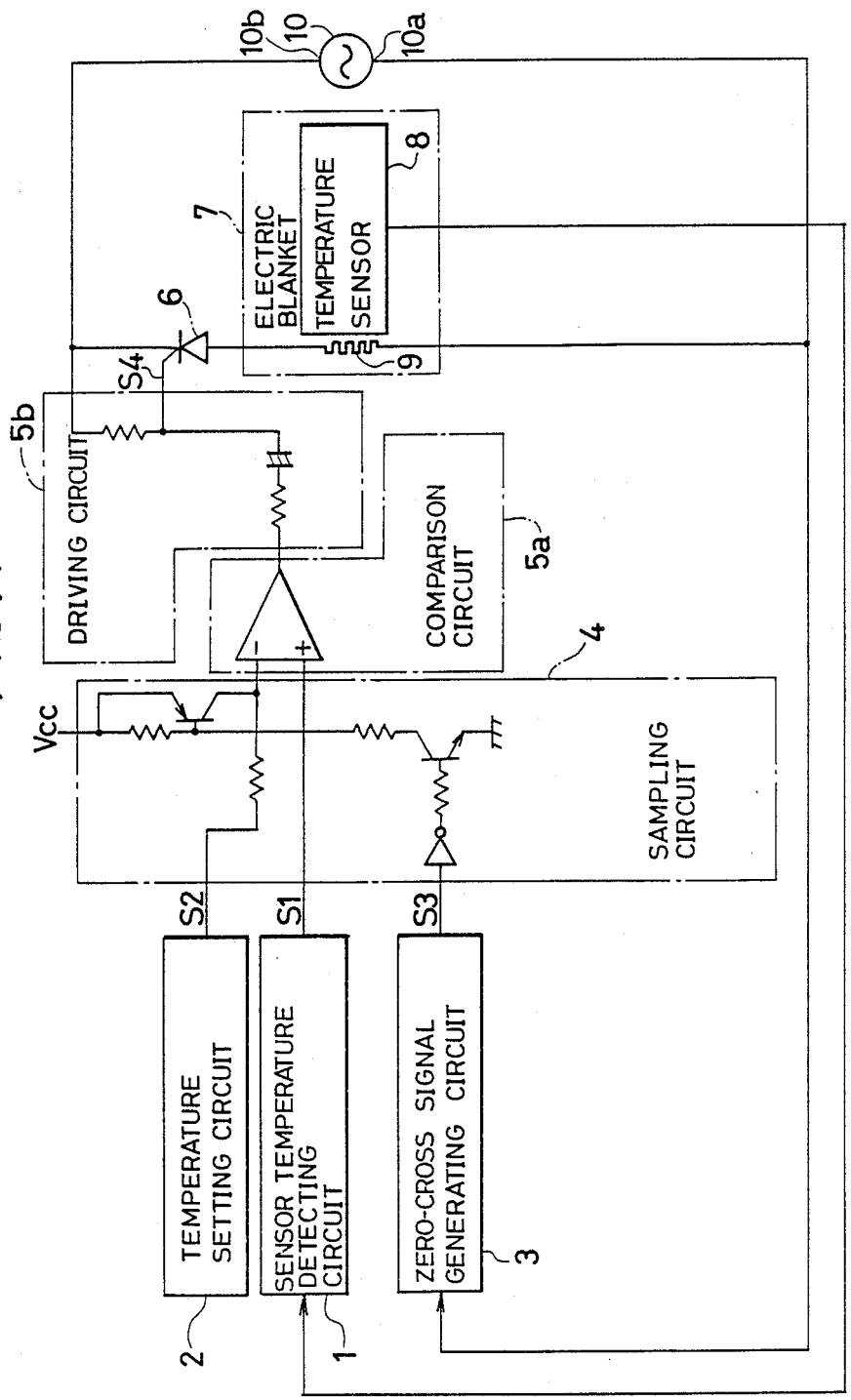
FIG. 1 is a block diagram showing a temperature controller according to the prior art.

FIG. 3 is a block diagram showing a temperature controller according to an embodiment of the present invention.

In the figure, the temperature controller comprises a sensor temperature detecting circuit 11, a temperature setting circuit 12, a pulse signal generating circuit 13, a sampling circuit 14, a comparison circuit 15, a driving circuit 16 and a thyristor 17.

Before a zero-cross point of an AC voltage applied through the thyristor 17, a temperature detection signal from a temperature sensor 19 disposed in an electric blanket 18 is compared with a set temperature set in the temperature setting circuit 12. According to a result of the comparison, the thyristor 17 is turned ON or OFF. If the thyristor 17 is turned ON, a current starts to flow at the zero-cross point of the AC voltage, and, if the thyristor 17 is turned OFF, the thyristor 17 is kept OFF until the next zero-cross point is attained.

The sensor temperature detecting circuit 11 receives a temperature detection signal outputted from the temperature sensor 19 disposed in the electric blanket 18 and supplies, according to the received signal, a temperature detection signal S10 to the comparison circuit 15. As the temperature of the electric blanket 18 decreases, a value of the temperature detection signal S10 increases.

The temperature setting circuit 12 has a setting device such as a variable resistor to generate a temperature setting signal S11 corresponding to a temperature set value set in the setting device. The temperature setting signal S11 is supplied to the sampling circuit 14.

The pulse signal generating circuit 13 comprises a current limiting resistor 21, a first pulse generator 22, a second pulse generator 23 and a zero-cross interval detecting circuit 24. The pulse signal generating circuit 13 receives an AC voltage from a commercial AC source 25 which supplies electric power to a heater wire 20 buried in a cloth of the blanket 18, and generates a first synchronous pulse signal S12 before a zero-cross point of the AC voltage as well as a second signal pulse signal S13 after the zero-cross point of he AC voltage.

Figure 4B:
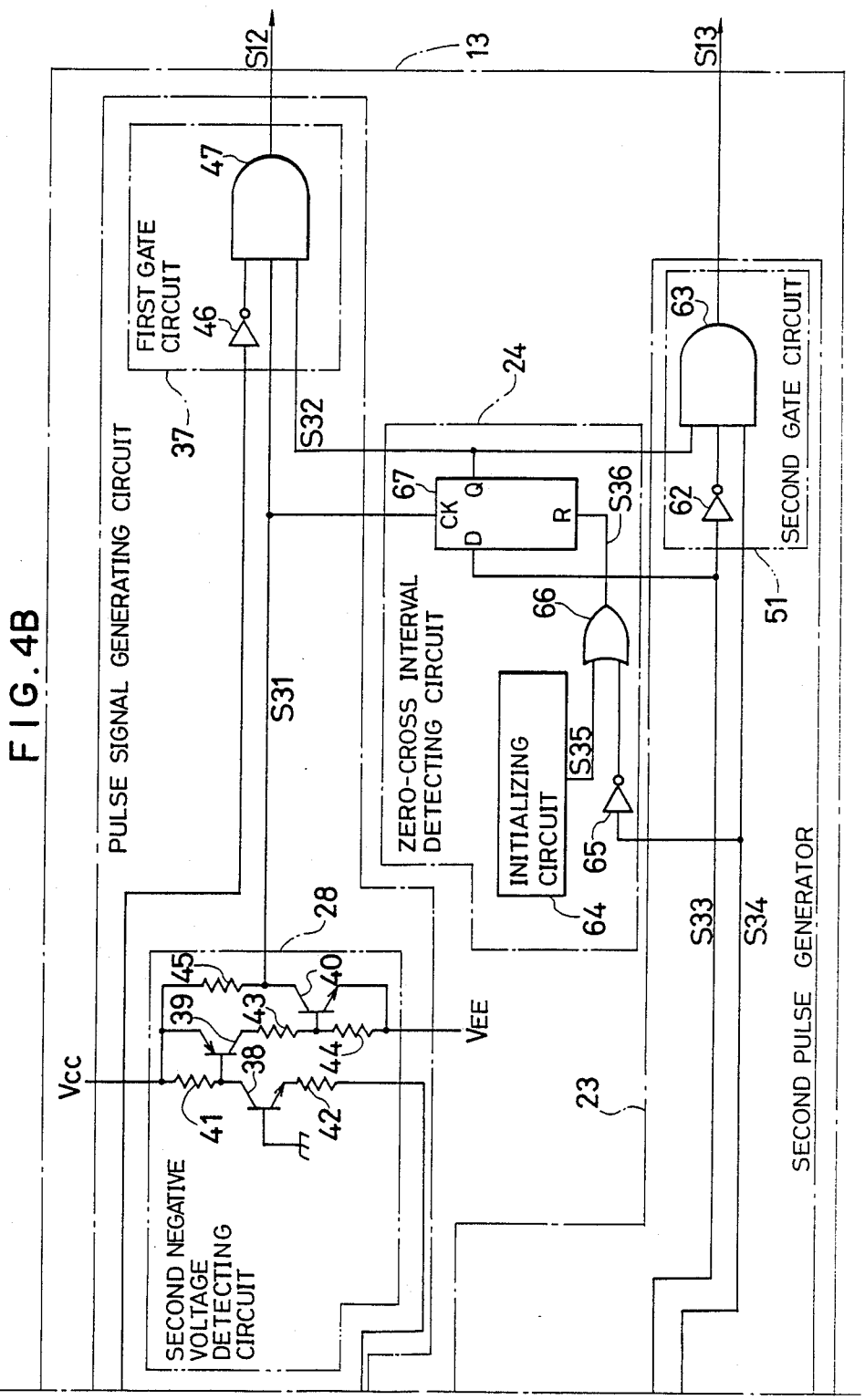

As shown in FIG. 4, the first pulse generator 22 comprises voltage limiting diodes 26a and 26b, a first negative voltage detecting circuit 27, a second negative voltage detecting circuit 28 and a first gate circuit 37. Slightly before the AC voltage applied to the thyristor 17 changes from negative to positive, the first pulse generator 22 generates the first synchronous pulse signal S12 and supplies the same to the sampling circuit 14.

The first negative voltage detecting circuit 27 comprises three transistors 29 to 31 that are turned ON when a forward voltage larger than a value Vb1 is applied to the diodes 26a and 26b, and five resistors 32 to 36 that constitute current paths of the transistors 29 to 31. When the polarity of the AC voltage shown in FIG. 5(A) outputted from the commercial AC source 25 becomes negative to apply a forward voltage exceeding the value Vb1 to the diodes 26a and 26b, the first negative voltage detecting circuit 27 generates a negative voltage detection signal S30 shown in FIG. 5(B) and supplies the same to the first gate circuit 37.

Similar to the first negative voltage detecting circuit 27, the second negative voltage detecting circuit 28 comprises three transistors 38 to 40 that are turned ON when a forward voltage larger than a value Vb2 is applied to the diodes 26a and 26b, and five resistors 41 to 45 that constitute current paths of the transistors 38 to 40. When the polarity of the AC voltage outputted from the commercial AC source 25 becomes negative to apply a forward voltage exceeding the value Vb2 to the diodes 26a and 26b, the second negative voltage detecting circuit 28 generates a negative voltage detection signal S31 shown in FIG. 5(C) and supplies the same to the first gate circuit 37. Each of the values Vb2 and Vb1 is set to be smaller than a forward conduction voltage "$2 \times VF$" of the diodes 26a and 26b connected in series. Further, a value of the resistor 32 arranged in the first negative voltage detecting circuit 27 is set to be larger than a value of the resistor 41 arranged in the second negative voltage detecting circuit 28 to establish the following relation:

$$|Vb2| > |Vb1|$$

The first gate circuit 37 comprises an inverter 46 for inverting the negative voltage detection signal S30, and an AND gate 47 for providing a logical product of an output of the inverter 46, the negative voltage detection signal S31 and a zero-cross interval signal S32 (FIG. 5(F)) to generate the first synchronous pulse signal S12 shown in FIG. 5(G) according to the negative voltage detection signal S30, negative voltage detection signal S31 and zero-cross interval signal S32.

The second pulse generator 23 comprises voltage value limiting diodes 48a and 48b, a first positive voltage detecting circuit 49, a second positive voltage detecting circuit 50 and a second gate circuit 51. Slightly after the AC voltage applied to the thyristor 17 changes from negative to positive, the second pulse generator 23 generates the second synchronous pulse signal S13 and supplies the same to the driving circuit 16.

The first positive voltage detecting circuit 49 comprises two transistors 52 and 53 that are turned ON when a forward voltage larger than a value Vb3 is applied to the diodes 48a and 48b, and three resistors 54, 55 and 56 that constitute current paths of the transistors 52 and 53. When the polarity of the AC voltage outputted from the commercial AC source 25 becomes positive to apply a forward voltage exceeding the value V$b3$ to the diodes 48a and 48b, the first positive voltage detecting circuit 49 generates a positive voltage detection signal S33 shown in FIG. 5(D) and supplies the same to the second gate circuit 51.

Similar to the first positive voltage detecting circuit 49, the second positive voltage detecting circuit 50 comprises two transistors 57 and 58 that are turned ON when a forward voltage larger than a value V$b4$ is applied to the diodes 48a and 48b, and three resistors 59, 60 and 61 that constitute current paths of the transistors 57 and 58. When the polarity of the AC voltage outputted from the commercial AC source 25 becomes positive to apply a forward voltage exceeding the value V$b4$ to the diodes 48a and 48b, the second positive voltage detecting circuit 50 generates a positive voltage detection signal S34 shown in FIG. 5(E) and supplies the same to the second gate circuit 51. Each of the values V$b4$ and V$b3$ is set to be smaller than a forward conduction voltage "$2 \times VF$" of the diodes 48a and 48b connected in series. Further, a value of the resistor 54 arranged in the first positive voltage detecting circuit 49 is set to be larger than a value of the resistor 59 arranged in the second positive voltage detecting circuit 51 to establish the following relation:

$$|Vb4| > |Vb3|$$

The second gate circuit 51 comprises an inverter 62 for inverting the positive voltage detection signal S33, and an AND gate 63 for providing a logical product of an output of the inverter 62, the positive voltage detection signal S34 and the zero-cross interval signal S32 to generate the second synchronous pulse signal S13 shown in FIG. 5(H) according to the positive voltage detection signal S33, positive voltage detection signal S34 and zero-cross interval signal S32.

The zero-cross interval detecting circuit 24 comprises an initializing circuit 64 for detecting that a power switch is turned ON and generating a reset signal S35, an inverter 65 for inverting the positive voltage detection signal S34, an OR gate 66 for providing a logical sum of an output of the inverter 65 and the reset signal S35, and a D-type flip-flop 67. The D-type flip-flop 67 latches an output of the first positive voltage detecting circuit 49 when the second negative voltage detecting circuit 28 stops to output the negative voltage detection signal S31, and clears the latched result when the OR gate 66 supplies thereto a reset signal S36. Whenever the second negative voltage detection circuit 28 stops to output the negative voltage detection signal S31, the zero-cross interval detecting circuit 24 latches the output of the first positive voltage detecting circuit 49, generates the zero-cross interval signal S32 shown in FIG. 5(F) and supplies the same to the first gate circuit 37 and to the second gate circuit 51.

As explained in the above, the pulse signal generating circuit 13 generates the first synchronous pulse signal S12 before the AC voltage outputted from the commercial AC source 25 changes from negative to positive and the second pulse signal S13 after the instance, and supplies the signals to the sampling circuit 14 and the driving circuit 16, respectively.

The sampling circuit 14 comprises an inverter 69 for inverting the first synchronous pulse signal S12, a transistor 71 to be turned ON when the inverter 69 outputs a signal of 1, a resistor 70 for limiting a base current of the transistor 71, resistors 72 and 73 for dividing the voltage of an output of the transistor 71, a transistor 74 to be turned ON when a node voltage of the resistors 72 and 73 decreases, and a resistor 75 for limiting an output current value of the temperature setting circuit 12. When the first synchronous pulse signal S12 is not supplied to the sampling circuit 14, an output terminal voltage of the sampling circuit 14 is held at a power source voltage Vcc. If the first synchronous pulse signal S12 is supplied to the sampling circuit 14, it receives the temperature setting signal S11 from the temperature setting circuit 12 and supplies the same to the comparison circuit 15.

The comparison circuit 15 comprises an operational amplifier 76 for comparing an output of the sampling circuit 14 with the temperature detection signal S10 outputted from the sensor temperature detecting circuit 11. When the output terminal voltage of the sampling circuit 14 is held at the power source voltage Vcc, an output terminal of the comparison circuit 15 will be LOW. When the sampling circuit 14 outputs the temperature setting signal S11 the comparison circuit 15 compares a value of the temperature setting signal S11 with a value of the temperature detection signal S10 outputted from the sensor temperature detecting circuit 11. If the relation of S10 > S11 is established, i.e., if the temperature of the electric blanket 18 is lower than that set in the temperature setting circuit 12, the comparison circuit 15 generates a heater ON signal S14 and supplies the same to the driving circuit 16.

The driving circuit 16 comprises an RS-type flip-flop 80 to be set with the heater ON signal S14 and reset with the second synchronous pulse signal S13, a capacitor 82 to be charged with a set output terminal of the flip-flop 80 being LOW and discharged with the same being HIGH, a resistor 81 for determining a charge-discharge time constant of the capacitor 82, and a resistor 83 for converting a current discharged from the capacitor 82 into a voltage and generating a trigger signal S15. When the heater ON signal S14 is supplied, the driving circuit 16 generates the trigger signal S15 by discharging the charged capacitor 82 to make the thyristor 17 conductive. When the second synchronous pulse signal S13 is supplied, the driving circuit 16 stops to generate the trigger signal S15 and starts to charge the capacitor 82.

The operation of the embodiment will be explained with reference to waveforms shown in FIGS. 6(A) to 6(H).

Slightly before the AC voltage shown in FIG. 6(A) outputted from the commercial AC source 25 changes from negative to positive (for example, at time tl), the first pulse generating circuit 22 detects the fact and generates the first synchronous pulse signal S12 shown n FIG. 6(B) so that the sampling circuit 14 may select an output of the temperature setting circuit 12.

Accordingly, the input terminals of the operational amplifier 76 of the comparison circuit 15 receive the temperature setting signal S11 from the temperature setting circuit 12 and the temperature detection signal S10 from the sensor temperature detecting circuit 11.

If the temperature of the electric blanket 18 is lower than that set in the temperature setting circuit 12 to establish the relation of S10 > S11 is comparison circuit 15 generates the heater ON signal S14 shown in FIG. 6(E). As a result, the driving circuit 16 outputs the trigger signal S15 shown in FIG. 6(F) and supplies the same to the gate of the thyristor 17.

When a forward voltage is applied between the anode and cathode of the thyristor 17, the thyristor 17 becomes conductive as shown in FIG. 6(G). While the forward voltage is being applied to the thyristor 17, a driving current flows to the heater wire 20 as shown in FIG. 6(G).

Slightly after the AC voltage outputted from the commercial AC source 25 has changed from negative to positive (for instance, at time t2), the second pulse generating circuit 23 detects the fact and generates the second synchronous pulse signal S13 shown in FIG. 6(C) and supplies the same to the driving circuit 16.

As a result, the driving circuit 16 stops to generate the trigger signal S15 and returns to an initial state.

As explained in the above, according to this embodiment of the present invention, it is determined whether the thyristor 17 shall be turned ON or OFF slightly before the AC voltage outputted from the commercial AC source 25 changes from negative to positive. If it is determined to turn OFF the thyristor 17, the thyristor 17 is kept OFF until the next trigger timing is attained. Therefore, the heater wire 20 is not subjected to a sudden current.

Figure 7B:
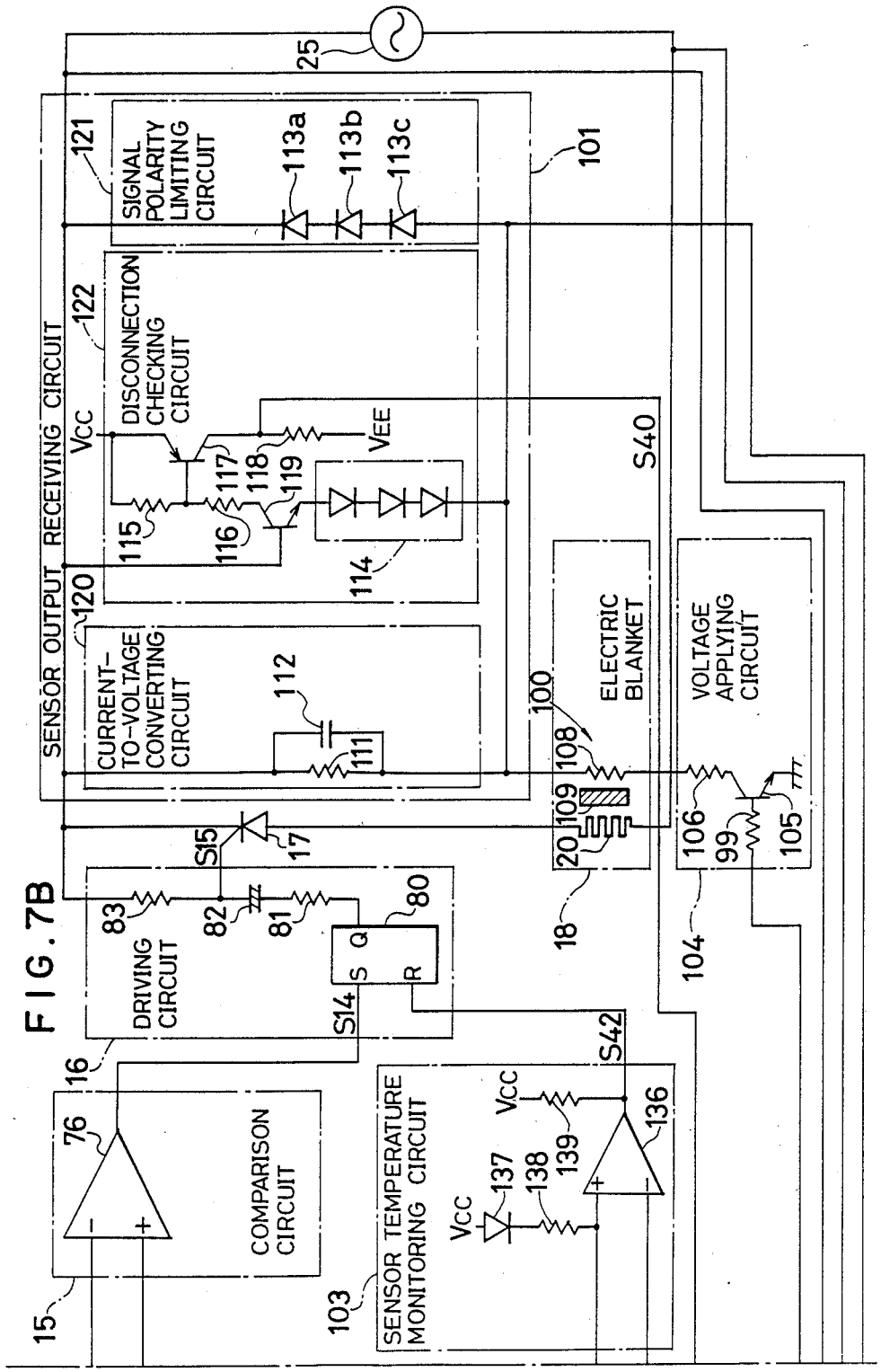

FIG. 7 is a block diagram showing a temperature controller according to another embodiment of the present invention. In the figure, the parts corresponding to those shown in FIG. 3 are represented with like numerals What is different from the circuit shown in FIG. 3 is that the electric blanket 18 is provided with a temperature sensor 100 integral with the heater wire 20 while the temperature controller is provided with a voltage applying circuit 104, a sensor output receiving circuit 101, a temperature set value monitoring circuit 102 and a sensor temperature monitoring circuit 103. When the second synchronous pulse signal S13 is outputted from the second pulse generating circuit 23, it is checked to see whether or not the temperature sensor 100 is disconnected, whether or not the temperature set value set in the temperature setting circuit 12 is within a predetermined range, and whether or not the temperature of the electric blanket 18 obtained by the sensor temperature detecting circuit 11 is within a predetermined range. If any one of them is abnormal, the RS-type flip-flop 80 will not be reset so that the trigger signal S15 may not be outputted after the instance.

The voltage applying circuit 104 comprises a transistor 105 to be turned ON when the second synchronous pulse signal S13 is outputted from the second pulse generating circuit 23, a base current limiting resistor 99 disposed between a base of the transistor 105 and an output terminal of the second pulse generating circuit 23, and a voltage-dividing resistor 106 disposed between a collector of the transistor 105 and one end of a sensor electrode 108 of the temperature sensor 100. When the second synchronous pulse signal S13 is outputted from the second pulse generating circuit 23, the voltage applying circuit 104 lowers the one end of the sensor electrode 108 nearly to a voltage VEE.

Figure 8:
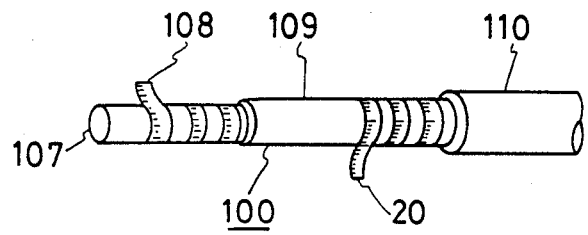
FIG. 8 is a perspective view showing the details of a temperature sensor shown in FIGS. 7a and 7b.

As shown in FIG. 8, the temperature sensor 100 comprises a core thread 107 formed linearly, the ribbon-like sensor electrode 108 spirally wound around the core thread 107, and a heat sensitive dielectric layer 109 covering the sensor electrode 108 and core thread 107. On the periphery of the heat sensitive dielectric layer 109, the heater wire 20 is spirally wound, and an insulating outer sheath 110 covers the heater wire 20 and heat sensitive dielectric layer 109.

If the temperature of the heat sensitive dielectric layer 109 changes, a permittivity of the heat sensitive dielectric layer 109 changes accordingly, thus changing an electrostatic capacity between the sensor electrode 108 and the heater wire 20.

The sensor output receiving circuit 101 comprises a current-to-voltage converting circuit 120, a signal polarity limiting circuit 121, and a disconnection checking circuit 122. If the voltage applying circuit 104 does not lower the one end of the sensor electrode 108 to the voltage VEE, a voltage is applied to the heater wire 20, and charges flow to the sensor electrode 108 in response to a permittivity corresponding to the temperature of the heat sensitive dielectric layer 109. Then, according to the amount of the charges flown to the sensor electrode 108, the sensor output receiving circuit 101 generates a temperature detection signal and supplies the same to the sensor temperature detecting circuit 11.

When the voltage applying circuit 104 lowers the one end of the sensor electrode 108 nearly to the voltage VEE, the sensor output receiving circuit 101 checks to see whether or not the other end of the sensor electrode 108 has been lowered nearly to the voltage VEE. If the other end of the sensor electrode 108 is nearly at the voltage VEE, the sensor output receiving circuit 101 generates a non-disconnection detection signal S40 and supplies the same to the temperature set value monitoring circuit 102.

The current-to-voltage converting circuit 120 comprises a resistor 111 disposed between the other end of the sensor electrode 108 and the cathode of the thyristor 17 to convert a current into a voltage, and a capacitor 112 connected in parallel with the resistor 111 to absorb a noise. When the voltage applying circuit 104 does not lower the one end of the sensor electrode 108 close to the voltage VEE, the current-to-voltage converting circuit 120 generates a temperature detection signal S39 of a value corresponding to the amount of charge flown to the sensor electrode 108 and supplies the same to the sensor temperature detecting circuit 11.

The signal polarity limiting circuit 121 comprises three diodes 113a, 113b and 113c connected in series. When a node voltage of the resistor 111 and the sensor electrode 108 is going to have a value exceeding a predetermined value of positive polarity, the signal polarity limiting circuit 121 clips the node voltage to prevent the temperature detection signal S39 from having positive polarity.

The disconnection checking circuit 122 comprises a diode array 114 which becomes conductive when a node voltage of the resistor 111 and the sensor electrode 108 reaches a value lower than a predetermined value, a transistor 119 to be turned ON with the diode array 114 being conductive, resistors 115 and 116 for dividing a collector voltage of the transistor 119, a transistor 117 to be turned ON with the transistor 119 turned ON to decrease a node voltage of the resistors 115 and 116, and a resistor 118 for picking up a collector voltage of the transistor 117. When the voltage applying circuit 104 lowers the one end of the sensor electrode 108 nearly to the voltage VEE and when the other end of the sensor electrode 108 is nearly at the voltage VEE, the disconnection checking circuit 122 generates the non-disconnection detection signal S40 indicating that the sensor electrode 108 is not disconnected and supplies the same to the temperature set value monitoring circuit 102.

The temperature set value monitoring circuit 102 comprises a temperature variable width setting circuit 129, a gate circuit 130 and a comparison circuit 133. When the disconnection checking circuit 122 supplies the non-disconnection detection signal S40 to the monitoring circuit 102, the monitoring circuit 102 checks to see whether or not a set temperature set in the temperature setting circuit 12 is within a predetermined range. If it is in the predetermined range, the monitoring circuit 102 generates a set temperature acceptable signal S41 and supplies the same to the sensor temperature monitoring circuit 103.

The temperature variable width setting circuit 129 comprises three diodes 131a, 131b and 131c connected in series, and a resistor 132 for limiting a current flowing to the diodes 131a to 131c. When a power switch is in an ON state, the circuit 129 supplies a voltage Va which is nearly equal to "Vcc - 2V" and obtainable at a node of the resistor 132 and the diode 131c, to the gate circuit 130.

The gate circuit 130 comprises an inverter 123 for inverting the non-disconnection detection signal S40, a transistor 124 to be turned ON when the inverter 123 outputs a signal of 1, a resistor 125 for limiting a base current of the transistor 124, resistors 126 and 127 for dividing an output voltage of the transistor 124, a transistor 128 to be turned ON when a node voltage of the resistors 126 and 127 decreases, and a resistor 134 for limiting an output current value of the temperature variable width setting circuit 129. With no non-disconnection detection signal S40 supplied, the gate circuit 130 holds its output terminal voltage at Vcc. With the non-disconnection detection signal S40 supplied, the gate circuit 130 receives the voltage Va outputted from the temperature variable width setting circuit 129 and supplies the same to the comparison circuit 133.

Figure 9:
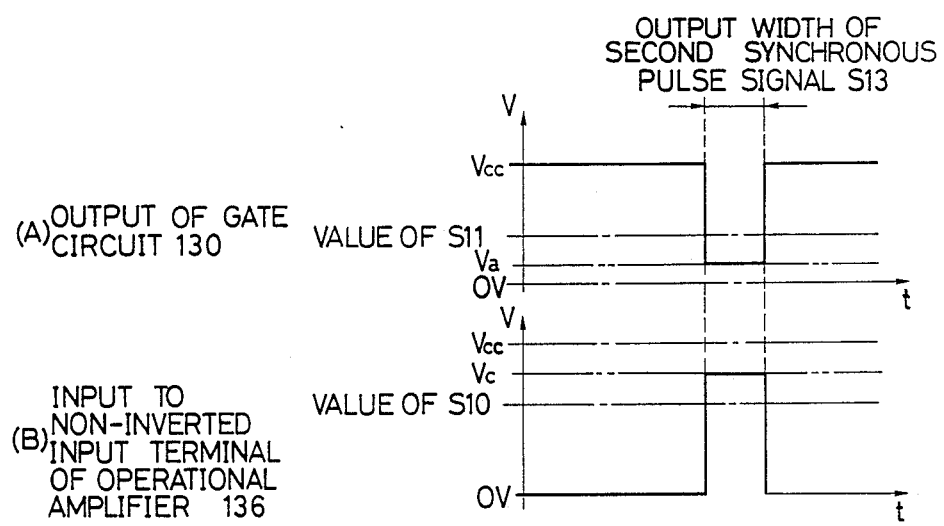
FIG. 9 is a waveform diagram showing the operation of the embodiment shown in FIGS. 7a and 7b.

The comparison circuit 133 comprises an open collector type operational amplifier 135 which compares an output of the gate circuit 130 with the temperature setting signal S11 outputted from the temperature setting circuit 12. When the gate circuit 130 holds its output terminal voltage at Vcc, an output terminal of the comparison circuit 133 will be LOW. When the gate circuit 130 outputs the voltage Va, the comparison circuit 133 compares the voltage Va with the temperature setting signal S11 outputted from the temperature setting circuit 12. If the relation of Va < S11 is established as shown in FIG. 9(A), i.e., if the set temperature set in the temperature setting circuit 12 is within the predetermined range, the comparison circuit 133 generates the set temperature acceptable signal (open collector signal) S41 and supplies the same to the sensor temperature monitoring circuit 103.

The sensor temperature monitoring circuit 103 comprises an open collector type operational amplifier 136, a diode 137 for determining a value variation range of the temperature detection signal S10, a resistor 138 disposed between a cathode of the diode 137 and a non-inverted input terminal of the operational amplifier 136, and a resistor 139 for pulling up an output terminal of the operational amplifier 136. When the output terminal of the gate circuit 130 is LOW, an output terminal of the monitoring circuit 103 is LOW. When the set temperature acceptable signal S41 is supplied to the monitoring circuit 103, the circuit 103 compares a voltage Vc which is nearly equal to "Vcc - 0.7 V" and determined by a forward voltage of the diode 137, with the temperature detection signal S10 outputted from the sensor temperature detecting circuit 11. If the relation of Vcc > S10 is established as shown in FIG. 9(B), i.e., if the temperature detection signal S10 outputted from the sensor temperature detecting circuit 11 is within the predetermined range, the circuit 103 generates a detected temperature acceptable signal S42 and supplies the same to a reset terminal of the RS-type flip-flop 80.

According to this embodiment of the present invention, after measuring the temperature of the electric blanket 18 and after determining whether the thyristor 17 shall be turned ON or OFF, it is checked to see whether or not the temperature sensor 100 is disconnected, whether or not the temperature set value set in the temperature setting circuit 12 is within the predetermined range, and whether or not the temperature of the blanket 18 obtained by the sensor temperature detecting circuit 11 is within the predetermined range. If any one of them is abnormal, the energization of the heater wire 20 is terminated at once.

Figure 10:
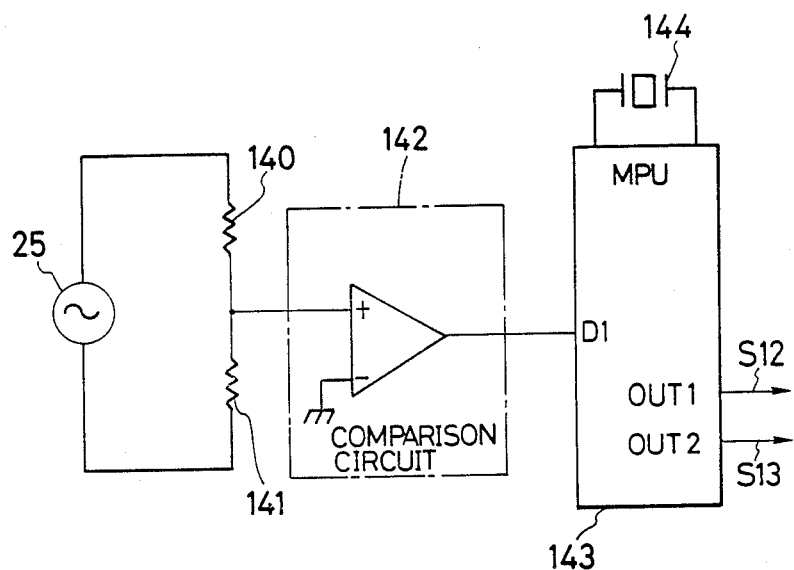
FIG. 10 is a circuit diagram showing another embodiment of the pulse signal generating circuit adopted for the temperature controller of the present invention.

In the embodiments mentioned in the above, the pulse signal generating circuit 13 comprises discrete parts. However, as shown in FIG. 10, a voltage of the commercial AC source 25 may be divided by resistors 140 and 141, and the divided result may be detected for its polarity in a comparison circuit 142. According to the detected result, a microcomputer 143 may detect a zero-cross point of the AC voltage outputted from the commercial AC source 25 to generate the first and second synchronous pulse signals S12 and S13. In this case, the generation timings of the first and second synchronous pulse signals S12 and S13 may be controlled in an accuracy corresponding to the frequency of a crystal oscillator 144 for supplying clock signals to the microcomputer 143.

In the embodiments mentioned in the above, the trigger signal S15 is generated according to the charging and discharging operations of the capacitor 82. However, the capacitor 82 may be replaced with a pulse transformer to provide the same effect as that provided by the above-mentioned embodiments.

Although the embodiments mentioned in the above use the thyristor 17 to energize the heater wire 20, a bidirectional switching element such as a triac may substitute for the thyristor 17. In this case, before and after a zero-cross point at which the AC voltage outputted from the commercial AC source 25 changes from negative to positive and before and after a zero-cross point at which the same changes from positive to negative, the first and second synchronous pulse signals S12 and S13 are generated respectively to provide the same effect as that provided by the above-mentioned embodiments.

In the above-mentioned embodiments, the thyristor 17 is turned ON with the first synchronous pulse signal and OFF with the second synchronous pulse signal to block a current flowing to the heater, so that electric power may be saved.

In summary, according to the present invention, the determination of turning ON or OFF a thyristor is made before a zero-cross point of an AC voltage applied to the thyristor so that the thyristor may surely be turned ON or OFF at the zero-cross point of the AC voltage outputted from the commercial AC source, thereby preventing electromagnetic wave noises from occurring.

Various modifications will become possible for those skilled in the art after receiving the teachings of the present disclosure without departing from the scope thereof.

What is claimed is:

1. A device for controlling a temperature of an electrical appliance, comprising:
   a heating device for heating said electrical appliance;
   a thyristor connected to an AC voltage source in series with the heating device;
   a temperature setting circuit for predetermining a target temperature level at which the temperature of the electrical appliance is to be maintained and outputting a signal indicative of the target temperature level;
   a temperature detecting circuit for detecting the temperature of the electrical appliance and outputting a signal indicative thereof;
   a first pulse generator coupled to said AC voltage source for outputting a first pulse signal during the time period in which the phase of the output voltage of said AC voltage source is negative, wherein the trailing edge of said first pulse signal is prior to the zero point of the output voltage of said AC voltage source;
   a comparator for outputting a signal indicative of a high temperature condition of said heating device by comparing the signal indicative of the target temperature level from said temperature setting circuit and the signal indicative of the temperature of the electrical appliance; and
   a trigger circuit for outputting a trigger pulse to said thyristor when both said first pulse signal and said high temperature indicative signal overlap, the pulse width of the trigger pulse extending beyond the zero point of said output voltage;

2. The temperature controlling device of claim 1 wherein a turning on period of said thyristor is determined by said first pulse generator which outputs said first pulse signal indicative of the trigger starting point before said zero point and a second pulse generator which outputs a second pulse signal indicative of the trigger end point.

3. The temperature controlling device of claim 2 wherein said temperature setting circuit is connected with said comparator through a sampling circuit which transmits a signal indicative of said target temperature level from said temperature setting circuit to said comparator in accordance with said first pulse signal.

4. The temperature controlling device of claim 2 further comprising an RS flip-flop which is coupled with said comparator and said second pulse generator and transmits, as the trigger signal, the signal indicative of said high temperature condition from said comparator to said thyristor in accordance with said second pulse signal received, as a reset signal, from said second pulse generator.

5. The temperature controlling device of claim 2 wherein said first pulse generator comprises a first negative voltage detection circuit which outputs a signal indicating that an output level of said voltage source has become lower than a first negative level, a second negative voltage detection circuit which outputs a signal indicating that the output level of said voltage source has become lower than a second negative level which is lower than said first negative level, and a logic "AND" circuit which receives as inputs an inverted signal of the output signal of said first negative voltage detection circuit and the output signal of said second negative voltage detection circuit and which outputs a logical product thereof as said first pulse signal.

6. The temperature controlling device of claim 5 wherein said first pulse generator comprising transistors which input, as control signals thereof, said negative voltage from said voltage source, and said first and second negative levels are adjusted on the basis of the threshold voltage levels of said transistors.

7. The temperature controlling device of claim 2 wherein said second pulse generator comprises a first positive voltage detection circuit which outputs a signal indicative that the output level of said voltage source becomes higher than a first positive level, a second positive voltage detection circuit which outputs a signal indicative that the output level of said voltage source becomes higher than a second positive level which is higher than said first positive level, and a logic "AND" circuit which receives as inputs the inverted signal of the output signal of said first positive voltage detection circuit and the output signal of said second positive voltage detection circuit and which outputs a logical product thereof as said second pulsed signal.

8. The temperature controlling device of claim 5 wherein said second pulse generator comprising transistors which input, as control signals thereof, said positive voltage from said voltage source, and said first and second positive levels are adjusted on the basis of the threshold voltage levels of said transistors.

9. The temperature controlling device of claim 1 wherein said trigger signal is transmitted from said circuit means to said thyristor through a disconnection checking circuit which is connected in series with a temperature sensor provided in said electrical appliance.

10. The temperature controlling device of claim 2 wherein said second pulse generator outputs the signal indicative of the end point of said time period through a disconnection checking circuit which is connected in series with a temperature sensor provided in said electrical appliance.

11. The controlling device of claim 10 wherein said disconnection checking circuit carries out the determination of disconnection in accordance with the existence or the absence of a current passing through a transistor which is connected in series with said sensor and receives, as a control signal, said second pulsed signal from said second pulse generator.

12. The temperature controlling device of claim 1 wherein said temperature detecting circuit detects the temperature of said electrical appliance in accordance with the signal supplied from a temperature sensor provided in said electrical appliance.

13. The temperature controlling device of claim 1 wherein said electrical appliance is an electrical blanket.

* * * * *